United States Patent [19]

Miyaki et al.

[11] 3,924,592
[45] Dec. 9, 1975

[54] INTAKE SYSTEM FOR THREE-VALVE INTERNAL COMBUSTION ENGINE

[75] Inventors: Kiyoshi Miyaki, Asaka; Hiroshi Kogure, Tokorozawa, both of Japan

[73] Assignee: Honda Giken Kogyo Kabushiki Kaisha, Tokyo, Japan

[22] Filed: Nov. 29, 1973

[21] Appl. No.: 420,226

[52] U.S. Cl. ... 123/122 AB; 123/32 SP; 123/32 ST; 123/75 B
[51] Int. Cl.² ......................................... F02M 31/00
[58] Field of Search .......... 123/122 AB, 32 SP, 191, 123/75 B, 52 MV, 52 MF, 32 ST; 165/52

[56] References Cited
UNITED STATES PATENTS

| | | | |
|---|---|---|---|
| 1,182,494 | 5/1916 | Leed | 123/122 AB |
| 1,333,611 | 3/1920 | Field | 123/122 AB |
| 1,407,850 | 2/1922 | Farr | 123/122 AB |
| 1,499,800 | 7/1924 | Bannister | 123/122 AB |
| 1,581,481 | 4/1926 | Barthel | 123/122 AB |
| 1,659,659 | 2/1928 | McCeren | 123/122 AB |
| 3,092,088 | 6/1963 | Goossah et al. | 123/75 B |
| 3,382,856 | 5/1968 | McIlroy | 123/75 B |
| 3,507,261 | 4/1970 | Myers | 123/32 ST |
| 3,508,530 | 4/1970 | Clawson | 123/32 ST |
| 3,659,564 | 5/1972 | Suzuki | 123/32 SP |

*Primary Examiner*—Charles J. Myhre
*Assistant Examiner*—R. H. Lazarus
*Attorney, Agent, or Firm*—Lyon & Lyon

[57] ABSTRACT

A three-valve internal combustion multi-cylinder engine has all of the cylinders in line, and each cylinder has a main combustion chamber and an auxiliary combustion chamber connected by a torch nozzle. A first intake passage delivers a rich mixture from a first carburetor to each of the auxiliary combustion chambers, and a second intake passage delivers a lean mixture to each of the main chambers. The engine is of the crossflow in-line type because the said second intake passages are located on one side of the line of cylinders, and the exhaust passages are located on the other side. Said first intake passage includes a transverse primary passage symmetrically connected to two longitudinal passages of equal length, and the longitudinal passages are each connected to two branch passages of equal length, the branch passages each being connected to one of the auxiliary chambers, respectively, so that the rich mixture is heated by the exhaust gases through a common wall. The common wall is provided with fins projecting into the exhaust passages.

6 Claims, 3 Drawing Figures

INTAKE SYSTEM FOR THREE-VALVE INTERNAL COMBUSTION ENGINE

This invention relates to spark-ignition internal combustion multi-cylinder engines of the cross-flow in-line type, all of the cylinders being in line, and their axes in the same plane. The main intake passages are located on one side of the line of cylinders and the exhaust passages are located on the other side, hence the term "cross-flow." Each cylinder has a main combustion chamber and an auxiliary combustion chamber connected by a torch nozzle. In the general plan of operation, a rich mixture delivered to each auxiliary combustion chamber is spark-ignited to cause a torch to pass through the torch nozzle to ignite a lean mixture in the main combustion chamber. Since each auxiliary chamber has an intake valve and each main chamber has an intake valve and an exhaust valve, engines of this type are known as three-valve engines.

It is highly desirable that the distribution of the rich mixture be substantially equal to each of the auxiliary combustion chambers, and that the rich mixture be heated to substantially the same temperature when delivered to each of the auxiliary chambers. Heating of the rich mixture is desirable to insure vaporization of the fuel and to prevent droplets from being delivered to the auxiliary chambers, or formed therein. However, in the case of in-line multicylinder engines, it is difficult to obtain equal distribution of the amount of rich mixture as well as to obtain equal heating thereof, particularly in the case when only one carburetor is provided for supplying rich mixture to all cylinders.

In accordance with this invention, a single transverse primary passage receives all of the rich mixture from the auxiliary carburetor, and this primary passage extends across the line of cylinders and is symmetrically connected to two longitudinal passages of equal length extending along the other side of the line of the cylinders. The longitudinal passages are each connected in turn to two branch passages of equal length, each of the branch passages being connected to one of the auxiliary chambers through its intake valve, respectively, so that the same length of path is provided from the auxiliary carburetor to each auxiliary chamber. Each longitudinal passage has a common wall with two adjacent exhaust passages, each leading from one of the main combustion chambers, respectively. In this way the rich mixture delivered to each of the auxiliary chambers is heated to the same extent by exhaust gases discharged from the main combustion chambers.

Other and more detailed objects and advantages will appear hereinafter.

Figure 1:
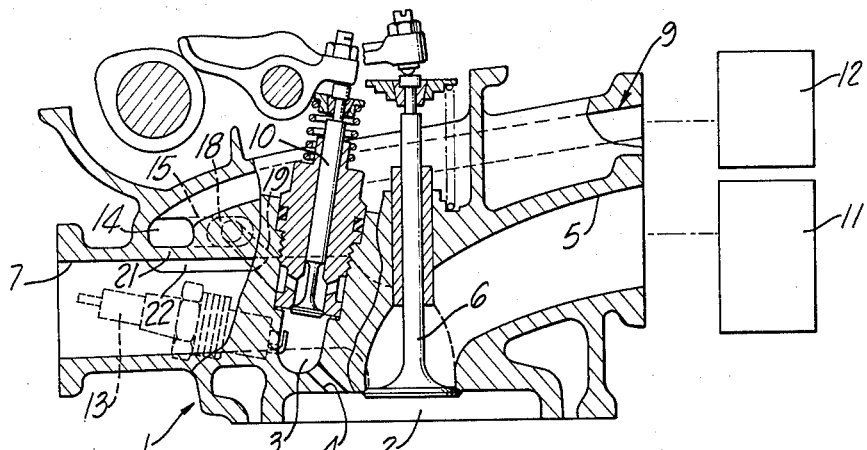
FIG. 1 is a sectional elevation showing a preferred embodiment of this invention.
Figure 2:
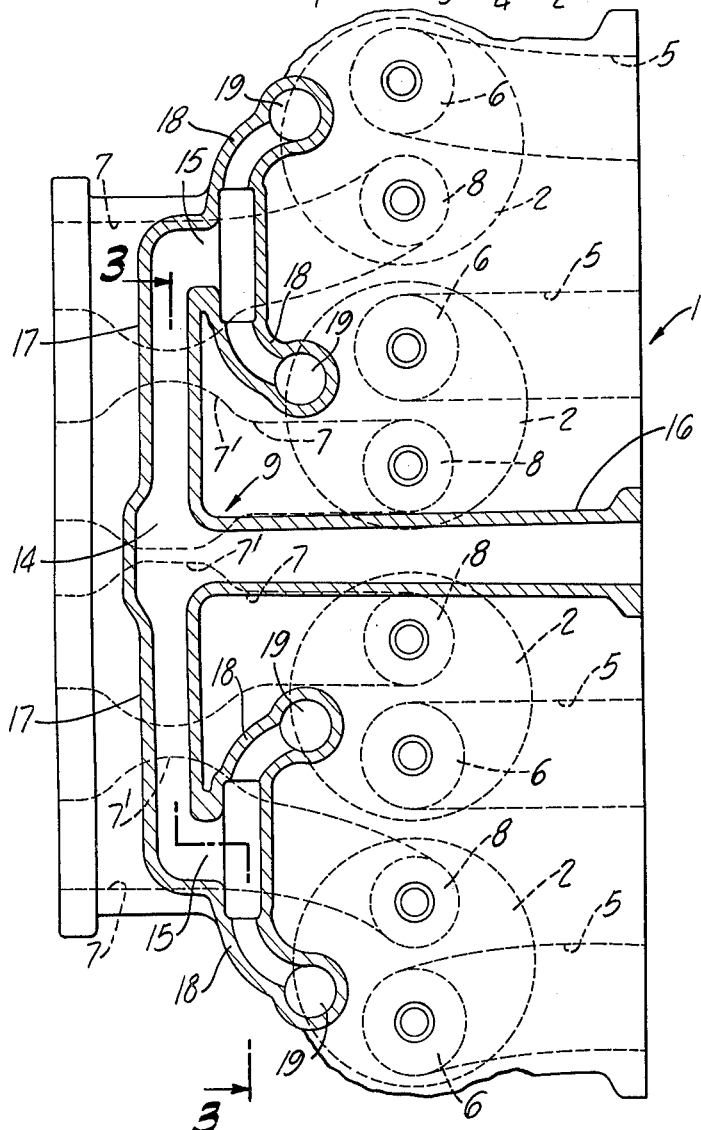
FIG. 2 is a sectional view taken along the axes of the passages which form the rich mixture intake system.
Figure 3:
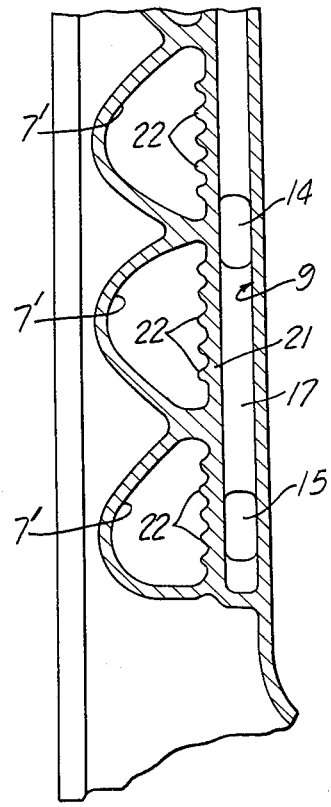
FIG. 3 is a sectional elevation taken substantially on the lines 3—3 as shown in FIG. 2.

Referring to the drawings, the four cylinder cross-flow in-line engine has an engine head generally designated 1 provided with main combustion chambers 2, each chamber having one wall formed by one of the pistons, not shown. Each main combustion chamber 2 has an auxiliary combustion chamber 3 connected thereto by a torch nozzle 4. Each main chamber 2 receives a lean mixture from its main intake passage 5 controlled by cam-operated intake valve 6. Similarly, each main chamber 2 has an exhaust passage 7 controlled by a cam-operated valve 8.

An auxiliary intake passage system generally designated 9 is provided to deliver a rich air-fuel mixture through cam-operated auxiliary intake valves 10 to each of the auxiliary chambers 3. A main carburetor 11 supplies lean air-fuel mixture to the main intake passages 5, and similarly an auxiliary carburetor 12 supplies rich mixture to the auxiliary intake passage system 9. Spark plugs 13 are provided for each of the auxiliary chambers 3. The intake system 9 includes a transverse primary passage 16 extending from the auxiliary carburetor 12 across the line of cylinders and is symmetrically connected to two longitudinal passages 17 of equal length adjacent the exhaust passages 7. An enlargement 14 is provided at the junction of the transverse passage 16 and the longitudinal passages 17. Branch passages 18 of equal length connect the distal ends of the passages 17 through openings 15 to the inlets 19 for each of the auxiliary chambers 3. The path from the auxiliary carburetor 12 is the same length to each of the auxiliary chambers 3.

Means are provided for heating the rich mixture as it passes through the longitudinal passages 17, and as shown in the drawings, this means includes a common wall 21 between each longitudinal passage 17 and each adjacent pair of enlargements 7' in the exhaust passages 7. This common wall 21 is provided with fins 22 which project into the enlargements 7'. From this description it will be understood that the heat of the exhaust gases passing through exhaust passages 7 and enlargements 7' is transmitted through the common walls 21 to heat the rich mixture in the longitudinal passages 17.

The lean mixture supplied by the main carburetor 11 to the main intake passages 5 is not positively heated, as compared to the auxiliary intake system 9, and therefore the charging efficiency into the main combustion chambers 2 is not lowered.

Having fully described our invention, it is to be understood that we are not to be limited to the details herein set forth but that our invention is of the full scope of the appended claims.

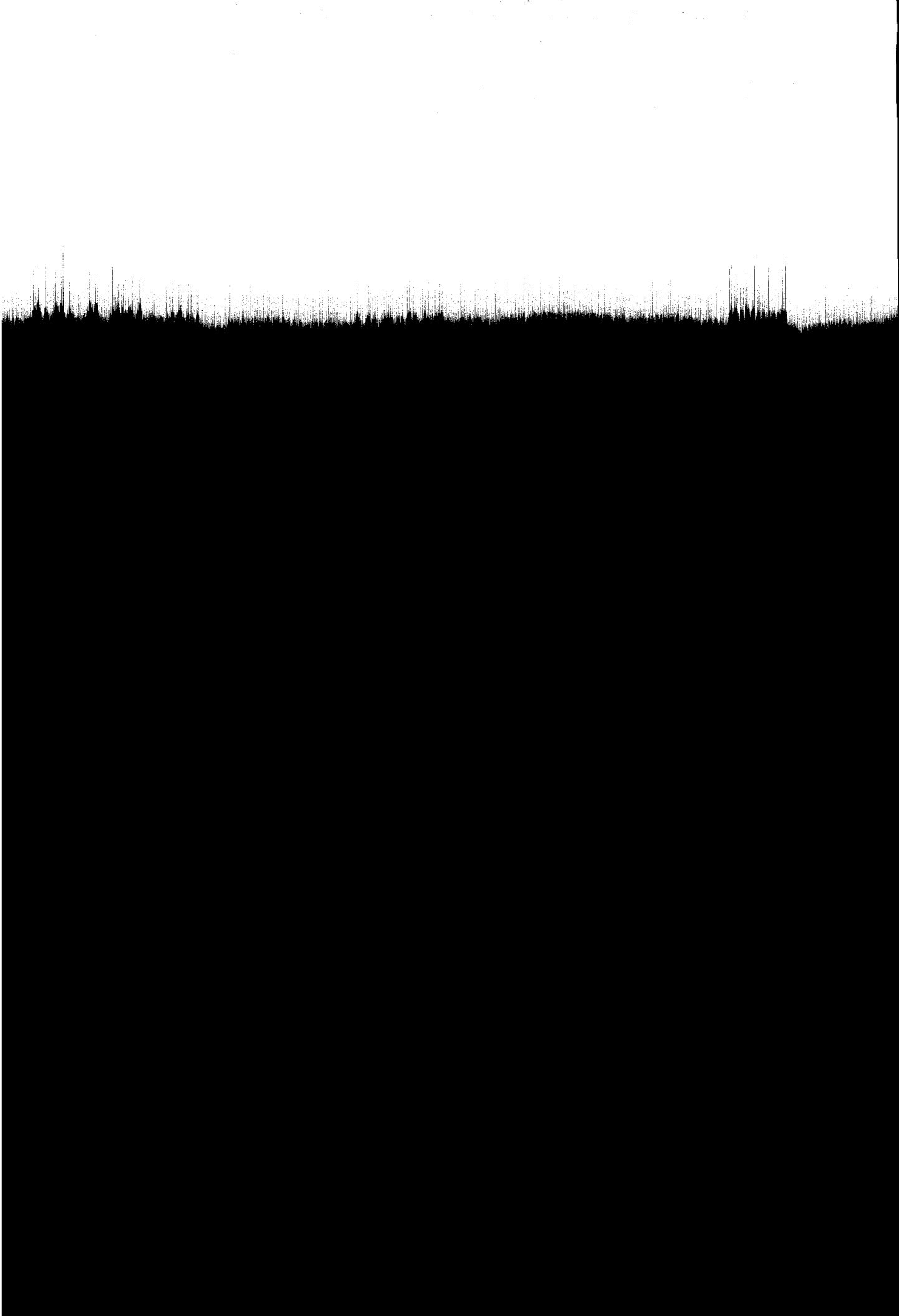

We claim:

1. In a four cylinder spark-ignition internal combustion piston engine, all of the cylinders being in line, each cylinder having a main combustion chamber and an auxiliary combustion chamber connected by a torch nozzle, the combination of: walls forming exhaust passages leading from each of the main combustion chambers, respectively, on one side of the line of cylinders, intake passage means on the other side of the line of cylinders for delivering a lean mixture to each of said main combustion chambers, additional intake passage means for delivering a rich mixture to each of said auxiliary combustion chambers, said additional intake passage means including a transverse primary passage extending across the line of cylinders and symmetrically connected to two longitudinal passages of equal length on the same side of the line of cylinders as said exhaust passages, said longitudinal passages each being connected to two branch passages of equal length, each of said branch passages being connected to one of said auxiliary chambers, respectively, each longitudinal passage having a common wall with two adjacent exhaust passages, respectively, whereby the rich mixture being delivered through said additional intake passage